(12) United States Patent
Ozaki et al.

(10) Patent No.: US 11,931,926 B2
(45) Date of Patent: Mar. 19, 2024

(54) JIG (71) Applicant: MITSUBISHI HEAVY INDUSTRIES, LTD., Tokyo (JP)

(72) Inventors: Ryota Ozaki, Tokyo (JP); Tetsuyuki Masuko, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 283 days.

(21) Appl. No.: 17/635,821

(22) PCT Filed: Nov. 14, 2019

(86) PCT No.: PCT/JP2019/044740
§ 371 (c)(1),
(2) Date: Feb. 16, 2022

(87) PCT Pub. No.: WO2021/095207
PCT Pub. Date: May 20, 2021

(65) Prior Publication Data
US 2022/0305699 A1 Sep. 29, 2022

(51) Int. Cl.
*B29C 33/48* (2006.01)
*B29C 33/46* (2006.01)

(52) U.S. Cl.
CPC .............. *B29C 33/46* (2013.01); *B29C 33/48* (2013.01)

(58) Field of Classification Search
CPC ........ B29C 33/46; B29C 33/48; B29C 33/485
See application file for complete search history.

(56) References Cited

U.S. PATENT DOCUMENTS

| 8,293,051 | B2 | 10/2012 | Morris et al. |
| 8,500,085 | B2 | 8/2013 | Jacob et al. |
| 9,296,187 | B2 | 3/2016 | Pham et al. |
| 10,059,041 | B2 | 8/2018 | Heath et al. |
| 2009/0166921 | A1 | 7/2009 | Jacob et al. |
| 2011/0277918 | A1 | 11/2011 | Lee et al. |

FOREIGN PATENT DOCUMENTS

| JP | 2009-542460 A | 12/2009 |
| JP | 2011-235635 A | 11/2011 |

OTHER PUBLICATIONS

PCT/ISA/210, "International Search Report for PCT International Application No. PCT/JP2019/044740," dated Dec. 17, 2019.
PCT/ISA/237, "Written Opinion for PCT International Application No. PCT/JP2019/044740," dated Dec. 17, 2019.

*Primary Examiner* — James Sanders
(74) *Attorney, Agent, or Firm* — Manabu Kanesaka; Benjamin Hauptman; Kenneth Berner (57) ABSTRACT

A jig includes mold parts that have a contact surface of a cylindrical part of a material to be molded having a shape complying with the inner peripheral surface of the cylindrical part and are arranged in a direction crossing one direction; a bladder that is provided on a side opposite to the contact surfaces of the plurality of mold parts relative to the mold parts, capable of accommodating a fluid therein, and expandable/retractable according to a pressure of the accommodated fluid; a joining part that joins the plurality of mold parts and the bladder; and a connection part that connects a one-side mold part and an another side mold part adjacent to the one-side mold part among a plurality of mold parts to each other and restricts an interval between the one-side mold part and the other-side mold part in a direction crossing the one direction with a prescribed range.

7 Claims, 7 Drawing Sheets

JIG

RELATED APPLICATIONS

The present application is National Phase of International Application No. PCT/JP2019/044740 filed Nov. 14, 2019, the disclosure of which is hereby incorporated by reference herein in its entirety.

TECHNICAL FIELD

The present disclosure relates to a jig, particularly to a jig used in molding of a composite material.

BACKGROUND ART

There is an aircraft structure in which a skin made of a composite material, such as carbon fiber reinforced plastic (CFRP), and a stringer are integrally molded. There is a case where a thermosetting resin is used and a case where a thermoplastic resin is used for CFRP as a synthetic resin of a base material.

Figure 10:
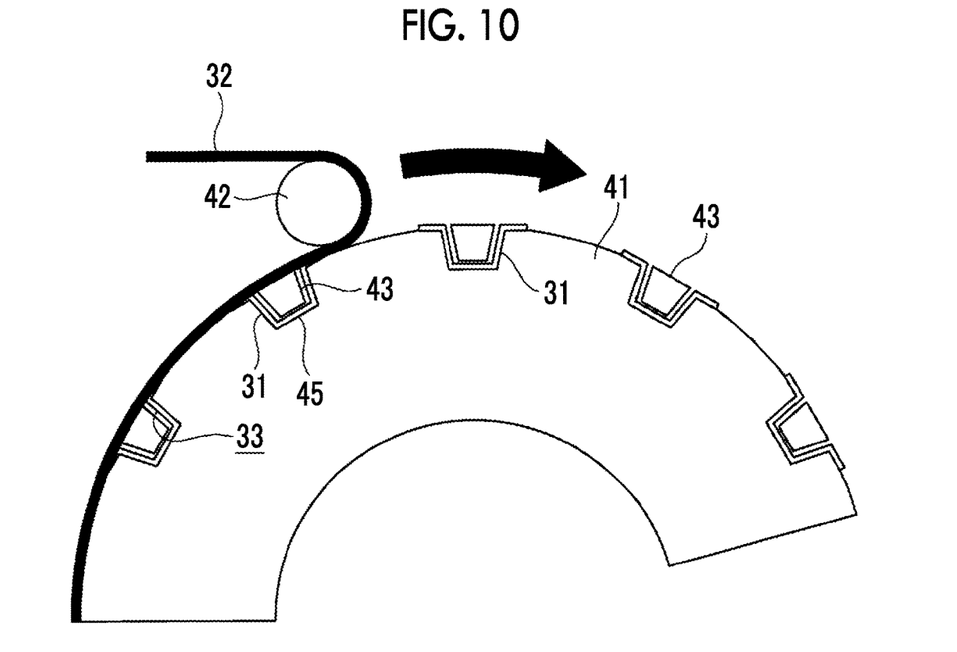
FIG. 10 is a cross sectional view showing a molding device of the related art including a mandrel and a roller.

In the related art, as a method of integrating a thermosetting CFRP skin and a stringer with each other, there is a method in which a plurality of stringers 31 are provided inside grooves 45 formed in a surface of a cylindrical mandrel 41, a skin 32 is laminated therefrom, and the stringers and the skin are integrated with each other by being pressed by a roller 42 as shown in FIG. 10.

In this method, in a case of forming a hollow space (hollow portion 33) inside a tubular portion 35 formed in a tubular shape by the skin 32 and the stringer 31, which are integrated with each other, a bladder 43 or a core is inserted into the hollow portion 33 such that a recessed deformation does not occur in a portion corresponding to the hollow portion 33 when pressed by the roller 42. For example, an example in which the bladder is inserted into the hollow portion is disclosed in PTLs 1 to 4 below.

CITATION LIST

Patent Literature

[PTL 1] U.S. patent Ser. No. 10/059,041
[PTL 2] U.S. Pat. No. 9,296,187
[PTL 3] U.S. Pat. No. 8,293,051
[PTL 4] U.S. Pat. No. 8,500,085

SUMMARY OF INVENTION

Technical Problem

The bladder is made of a soft and elastic material such as vinyl and rubber, and a cross sectional shape thereof can be changed by being inflated through injection of air. The core is made of a material having sufficiently high rigidity.

Since the bladder is made of a material that can be flexibly deformed when the bladder is inserted into the hollow portion, it is difficult to adjust the shape of an inner peripheral surface of the tubular portion for each place when pressed by the roller.

In a case of molding CFRP using a thermoplastic resin, in order to blend the synthetic resin and fiber, it is necessary to press a material by the roller at an extremely high pressure when laminating, compared to a case of using a thermosetting resin. In a case of the thermoplastic resin, a maximum pressure necessary for laminating is approximately 20 atm in some cases.

Figure 11:
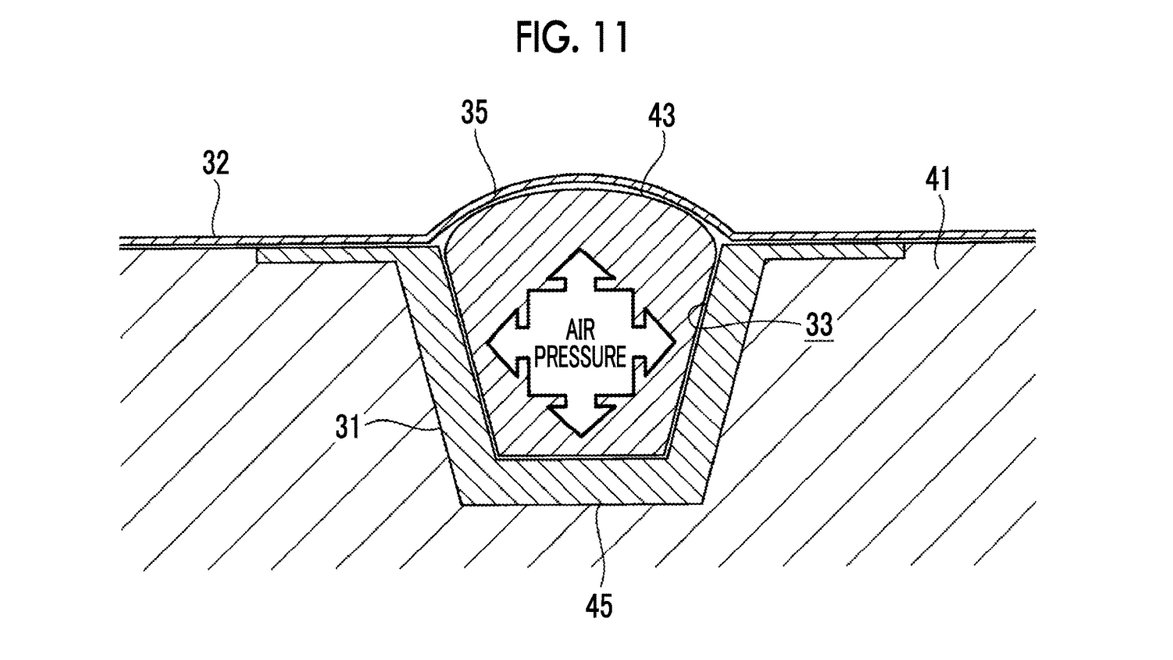
FIG. 11 is a partially enlarged view of FIG. 10.

Since the skin and the stringer are pressed by the roller at a high pressure in a case of integrating the thermoplastic CFRP skin and the stringer with each other under the method using the mandrel described above similar to thermosetting CFRP, a portion corresponding to the inner peripheral surface of the tubular portion is more likely to deform than a case of thermosetting CFRP. When the inside of the bladder is at a high pressure such that a recessed deformation does not occur, as shown in FIG. 11, the bladder 43 excessively inflates, and there is a high possibility that the position of the skin 32 deviates from a specified surface of a product.

In a case of using a core, demolding work of removing the core from the hollow portion between the skin and the stringer, which are integrated with each other, is necessary. However, it is difficult to demold the core from the hollow portion, and there is a problem that it takes much time and effort. In addition, insofar as a longitudinal direction of the stringer is not a straight line or a shape having a constant curvature, it is impossible to demold the core.

The present disclosure is devised in view of such circumstances, and an object thereof is to provide a jig that can define an internal shape of a material, which is long along one direction, in a predetermined shape and can be easily removed from the inside after molding.

Solution to Problem

In order to solve the problem, the jig of the present disclosure adopts the following means.

That is, a jig according to the present disclosure is a jig that is inserted into a hollow portion, which is surrounded by an inner peripheral surface of a tubular portion of a material to be molded and is formed in one direction. The jig includes a plurality of mold portions that each have a contact surface having a shape corresponding to the inner peripheral surface and are arranged in parallel in a direction intersecting the one direction, a bladder that is provided on an opposite side to the contact surfaces of the mold portions with respect to the mold portions, is capable of accommodating a fluid therein, and is capable of expanding and contracting according to a pressure of the accommodated fluid, a connecting portion that connects the plurality of mold portions and the bladder to each other, and a connection portion that connects, among the plurality of mold portions, a mold portion on one side and a mold portion on the other side adjacent to the mold portion on the one side to each other and regulates an interval between the mold portion on the one side and the mold portion on the other side in the direction intersecting the one direction within a predetermined range.

Advantageous Effects of Invention

With the present disclosure, the internal shape of the material which is long in the one direction can be defined in a predetermined shape and easy removal from the inside can be performed after molding.

DESCRIPTION OF EMBODIMENTS

Hereinafter, an embodiment according to the present disclosure will be described with reference to the drawings.

A jig 1 according to an embodiment of the present disclosure is disposed in a hollow portion formed between a skin and a stringer when integrating the skin made of a composite material, such as carbon fiber reinforced plastic (CFRP), and the stringer. The hollow portion is surrounded by an inner peripheral surface of a tubular portion formed in a tubular shape by the skin and the stringer and is formed in one direction. The skin and the stringer are examples of a material to be molded.

Figure 4:
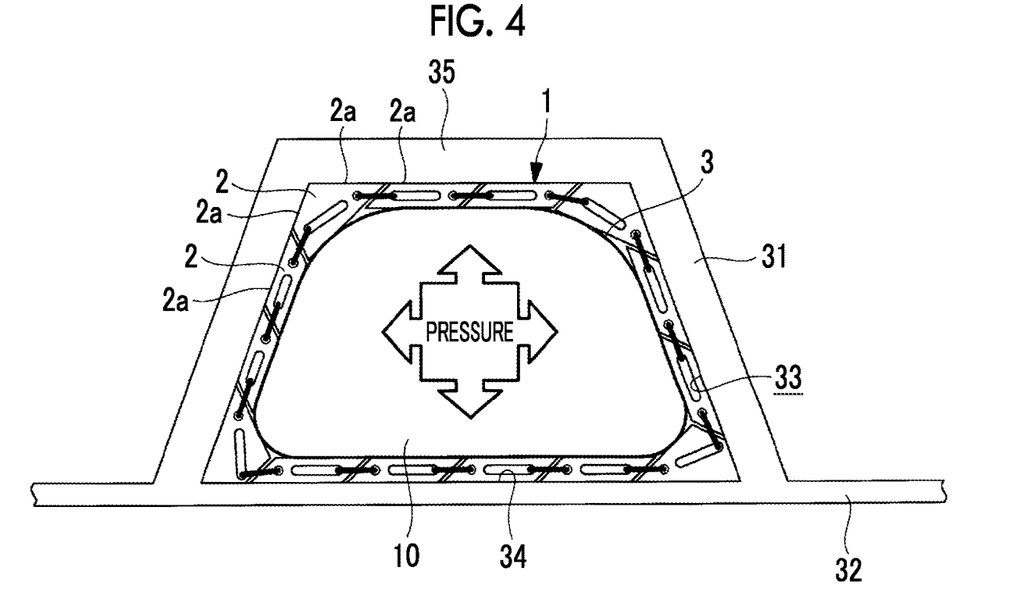
FIG. 4 is a cross sectional view showing a state where the jig according to the embodiment of the present disclosure is provided inside a hollow portion.
Figure 5:
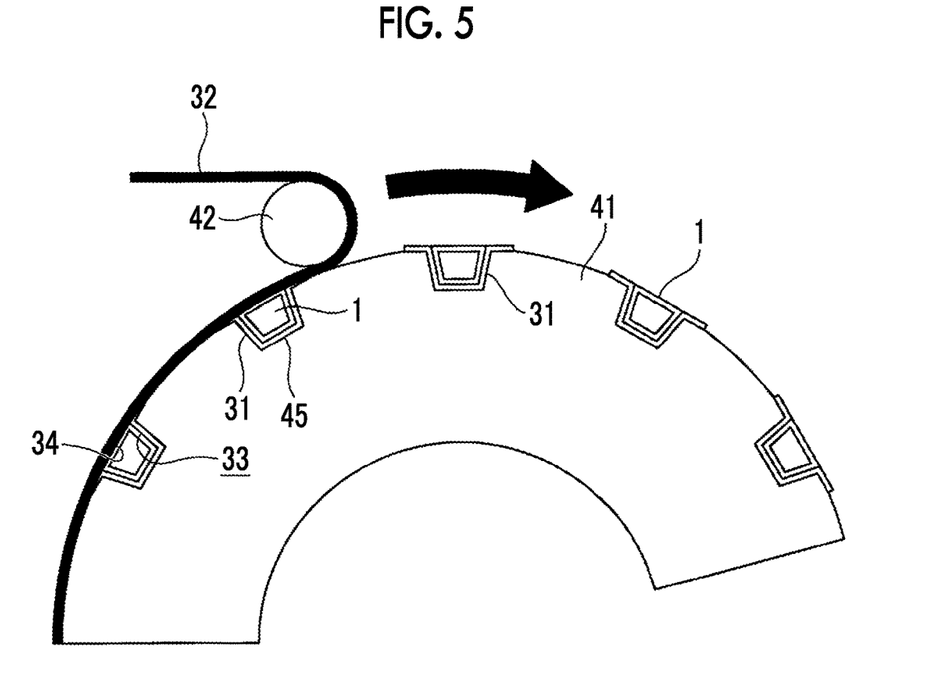
FIG. 5 is a cross sectional view showing a molding device including a mandrel and a roller.

A molding device of a composite material includes a mandrel 41 and a roller 42 as shown in FIG. 5. In a method in which a plurality of stringers 31 are provided inside grooves 45 formed in a surface of the cylindrical mandrel 41 and a skin 32 is laminated therefrom and is pressed by the roller 42, the jig 1 according to the present embodiment is disposed in the hollow portion 33 such that a recessed deformation does not occur in a portion corresponding to a hollow portion 33. When integrating the thermosetting CFRP skin 32 and the stringers 31 with each other, a hollow space (hollow portion 33) is formed inside a tubular portion 35 (see FIG. 4) formed in a tubular shape by the skin 32 and the stringers 31, which are integrated with each other. When pressed by the roller 42, the jig 1 is inserted into the hollow portion 33 such that the recessed deformation does not occur in the portion corresponding to the hollow portion 33.

The skin 32 is, for example, a plate-like component that has an arcuate cross section configuring a fuselage of an aircraft. The stringer 31 is an elongated member which is long in the one direction, and has a cross sectional shape such as a hat shape and a Z shape. Hereinafter, although a case where the cross section of the stringer 31 has a hat shape will be described, the present disclosure is not limited to this example. An aircraft structure is configured by molding the skin 32 and the stringer 31 integrally with each other.

As shown in FIGS. 1 to 4, the jig 1 according to the present embodiment includes a plurality of mold portions 2, a bladder 3, a connecting portion 4, and a connection portion 5.

The plurality of mold portions 2 are elongated components which are long in the one direction. As shown in FIG. 4, each of the plurality of mold portions 2 has a contact surface 2a having a shape corresponding to an inner peripheral surface 34 of the tubular portion 35 formed in a tubular shape by the skin 32 and the stringer 31.

Accordingly, when forming an aircraft component (for example, a fuselage) by molding the skin 32 and the stringer 31 integrally with each other, the shape of the inner peripheral surface 34 of the tubular portion 35 can be defined by the contact surfaces 2a of the plurality of mold portions 2.

Figure 1:
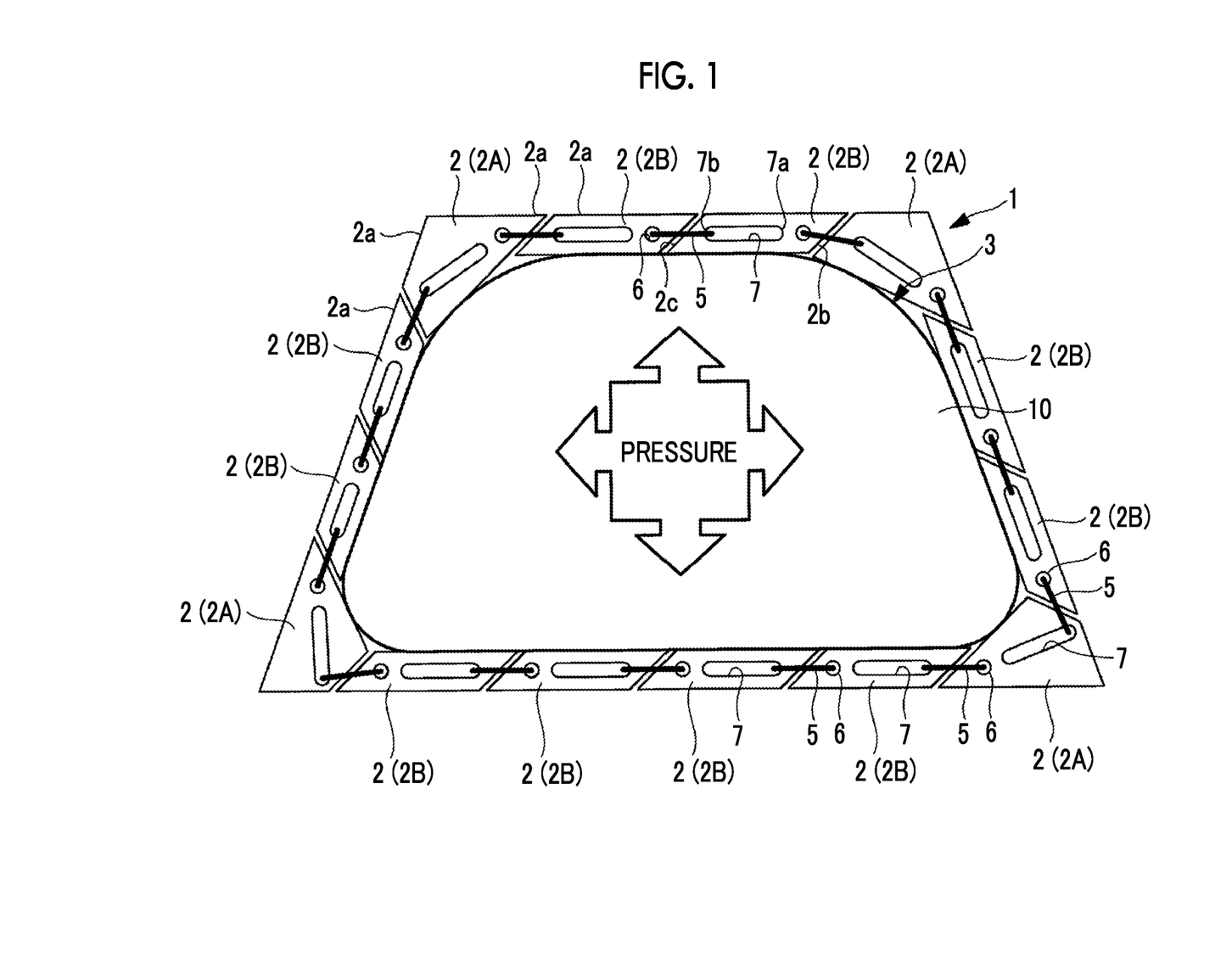
FIG. 1 is a cross sectional view showing a jig according to an embodiment of the present disclosure, and shows a state where a bladder is inflated.
Figure 2:
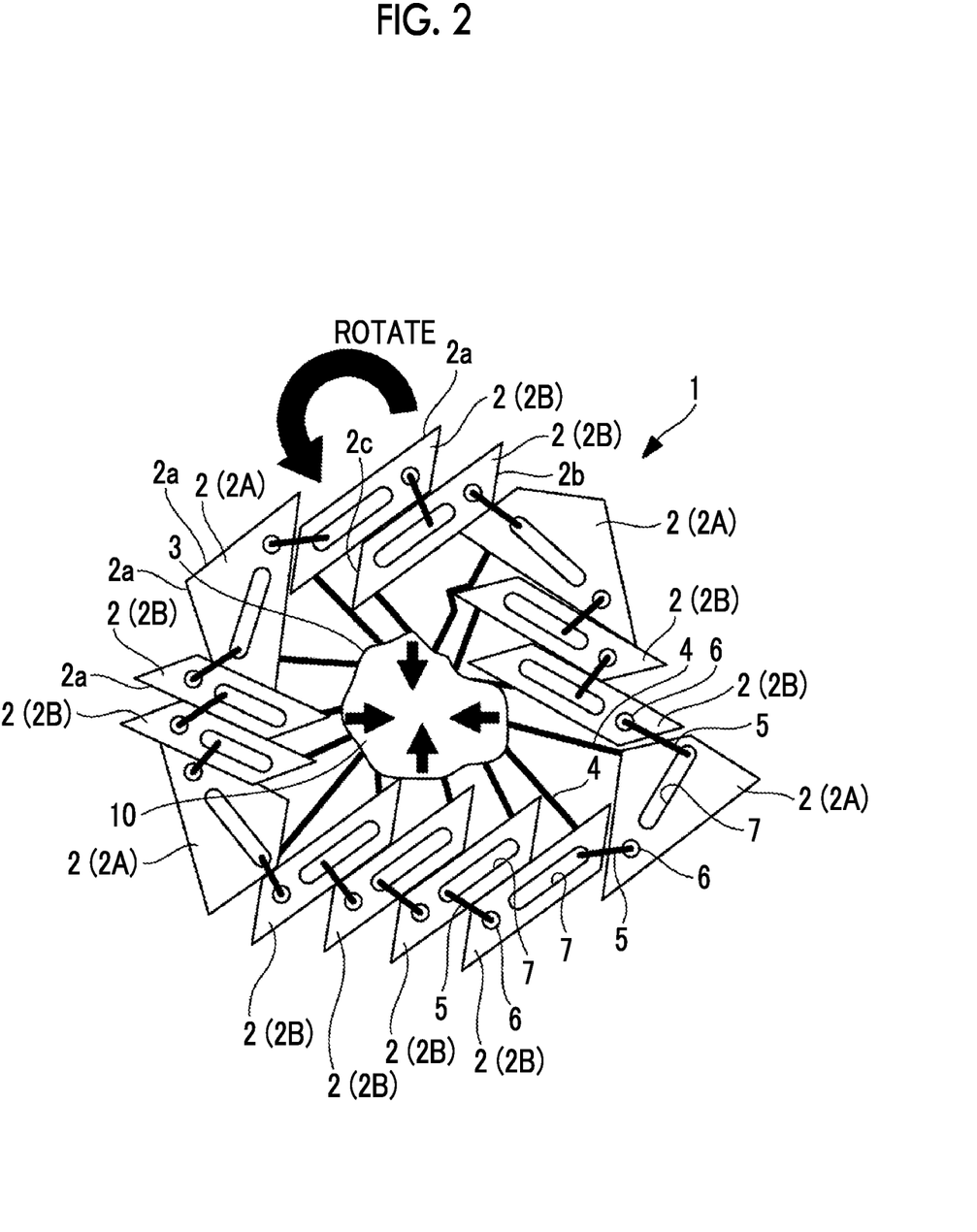
FIG. 2 is a cross sectional view showing the jig according to the embodiment of the present disclosure, and shows a state where the bladder is contracted.

The plurality of mold portions 2 are arranged in parallel in a direction intersecting a longitudinal direction in which the hollow portion 33 is extended. As shown in FIGS. 1 and 2, the plurality of mold portions 2 are connected to each other via the connection portion 5 such that cross sections thereof are annular. Accordingly, as shown in FIG. 4, when the bladder 3 is inflated, the contact surfaces 2a of the plurality of mold portions 2 come into contact with the entire inner peripheral surface 34.

The mold portion 2 is made of a material having higher rigidity than the bladder 3, for example, a metallic material such as an aluminum alloy and a synthetic resin material.

As shown in FIG. 1, the mold portion 2 has a corner component 2A which is disposed to correspond to a corner portion of the inner peripheral surface 34 and a flat component 2B which is between two corner components 2A and is disposed to correspond to a flat portion of the inner peripheral surface 34. The corner component 2A has, for example, a quadrangular shape of which a cross section lacks one apex of a triangle. The flat component 2B has, for example, a parallelogrammatic cross section.

Figure 3:
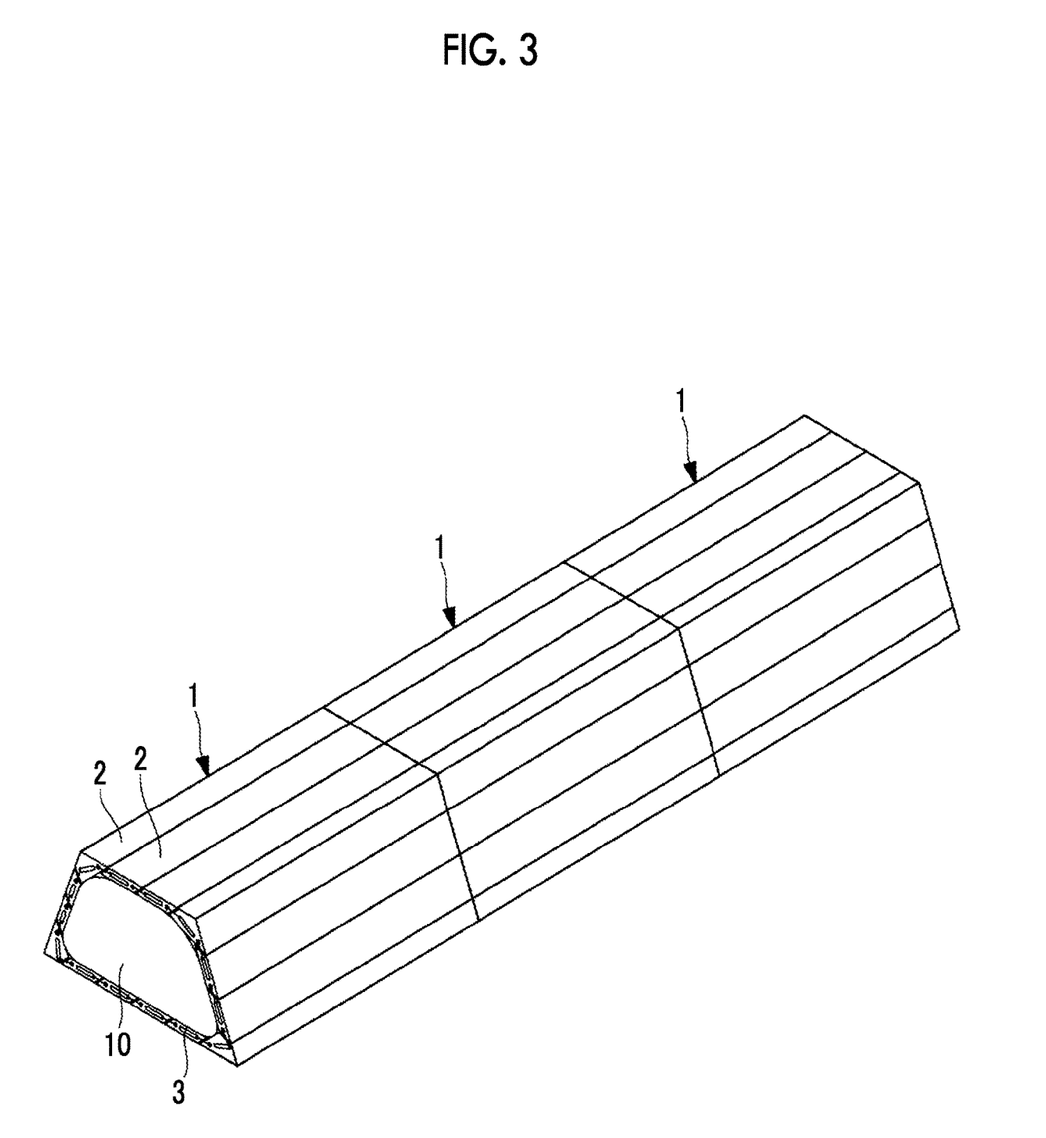
FIG. 3 is a perspective view showing the jig according to the embodiment of the present disclosure, and shows a state where the bladder is inflated.

A length in the longitudinal direction of the mold portion 2 may be the same as the length of the stringer 31 to be formed, or the jig 1 may be divided into a plurality of portions in a longitudinal direction of the stringer 31 and be disposed in the hollow portion 33 as shown in FIG. 3. Accordingly, also in a case where the stringer 31 is curved in the longitudinal direction, the jig 1 can be disposed in the hollow portion 33.

For example, the bladder 3 is made of a soft and elastic material such as vinyl and rubber, and is a bag-shaped member that can accommodate a fluid 10 therein. The fluid 10 accommodated inside the bladder 3 is, for example, a fluid (for example, air and a liquid) or powder. The bladder 3 is provided inside the plurality of annular mold portions 2, that is, with respect to each of the mold portions 2, on an opposite side to a contact surface 2a side of the mold portion 2 which is in contact with the inner peripheral surface 34. The bladder 3 is capable of expanding and contracting according to the pressure (for example, an air pressure, a liquid pressure, and a powder pressure) of the accommodated fluid 10. The bladder 3 is provided over the longitudinal direction of the mold portion 2.

The connecting portion 4 is made of, for example, the same material as the bladder 3 and a soft and elastic material such as vinyl and rubber, and connects the plurality of mold portions 2 and the bladder 3 to each other. One connecting portion 4 is provided for each of the mold portions 2, and one end of the connecting portion is connected to the mold portion 2, and the other end is connected to the bladder 3.

The connection portion 5 is a bar-shaped component provided at an end portion of the mold portion 2 in the longitudinal direction. The connection portion 5 connects the two mold portions 2, which are disposed adjacent to each other, to each other. That is, the connection portion 5 connects, among the plurality of mold portions 2, the mold portion 2 on one side and the mold portion 2 on the other side, which is adjacent to the mold portion 2 on the one side, to each other and regulates an interval between the mold portion 2 on the one side and the mold portion 2 on the other side within a predetermined range.

A fixing portion 6 to which the connection portion 5 is connected and a slide groove 7 are formed in an end surface of the end portion of the mold portion 2 in the longitudinal direction. The fixing portion 6 is, for example, a circular hole, and is provided at an end portion 2b (one end portion) of the mold portion 2 in a width direction. Herein, the width direction of the mold portion 2 means a direction intersecting the longitudinal direction of the mold portion 2, and means a direction along the inner peripheral surface 34 when the mold portion 2 is disposed along the hollow portion 33. One end of the connection portion 5 is connected to the fixing portion 6 of the mold portion 2 so as to be movable rotationally.

In addition, the slide groove 7 is, for example, a long groove which is provided from one end 7a to the other end 7b and is long in the one direction as shown in FIG. 1, and is formed in the end surface of the end portion of the mold portion 2 in the longitudinal direction in a direction along the contact surface 2a of the mold portion 2 from the one end 7a in the vicinity of the fixing portion 6 to the other end 7b in the vicinity of an end portion 2c in the width direction, which is on an opposite side to the end portion 2b where the fixing portion 6 is provided. In the slide groove 7 of the mold portion 2, the other end of the connection portion 5 is movably connected to the end surface of the mold portion 2 in the direction along the contact surface 2a.

When the bladder 3 inflates, the other end of the connection portion 5 moves to the other end 7b side of the slide groove 7. The length of the connection portion 5 is equal to a distance between the fixing portion 6 of the mold portion 2 on the one side and the other end 7b of the slide groove 7 of the mold portion 2 on the other side when the bladder 3 is inflated, or is slightly larger to a degree that the mold portions 2 adjacent to each other are slidable. Accordingly, when the bladder 3 is inflated, the interval between the mold portion 2 on the one side and the mold portion 2 on the other side is regulated within a predetermined range.

In a parallelogrammatic cross section of the flat component 2B of the mold portion 2, the apex provided on a side where the bladder 3 is provided, which is on an opposite side to the contact surface 2a, has an obtuse angle on a fixing portion 6 side, that is, an end portion 2b side, and has an acute angle on an end portion 2c side in the width direction, which is on an opposite side to the fixing portion 6.

As shown in FIG. 2, the connecting portion 4 connected to the bladder 3 is connected to the mold portion 2 at the end portion 2c (the other end portion) in the width direction, which is on an opposite side to the fixing portion 6 of the mold portion 2 to which the one end of the connection portion 5 is connected. Since the connecting portion 4 is connected at a position different from the centroid of the mold portion 2, the mold portion 2 is pulled inward while rotating when the bladder 3 is deflated.

As described above, in the present embodiment, since the plurality of mold portions 2 have the contact surfaces 2a each having a shape corresponding to the inner peripheral surface 34, the shape of the inner peripheral surface 34 can be defined by the contact surfaces 2a of the plurality of mold portions 2 when forming a molded product such as an aircraft fuselage. When the fluid 10 is accommodated inside the bladder 3, the bladder 3 is expanded and inflated according to the pressure of the fluid 10. The inflated bladder 3 presses the plurality of mold portions 2 from the opposite side to the contact surfaces 2a of the mold portions 2 with respect to the mold portions 2, that is, an inner side of the plurality of annular mold portions 2. Since the connection portion 5 regulates the interval between the mold portion 2 on the one side and the mold portion 2 on the other side, among the plurality of mold portions 2, within a predetermined range, the interval between the plurality of mold portions 2 is not excessively wide due to a pressing force of the bladder 3. As a result, since an inflated amount of the bladder 3 can be suppressed within a predetermined range, the bladder 3 can be prevented from being excessively inflated.

On the other hand, when the fluid 10 is discharged from the inside of the bladder 3, the bladder 3 is contracted and deflated according to the pressure of the fluid 10. The deflated bladder 3 pulls the plurality of mold portions 2 to a bladder 3 side, which is on the opposite side to the contact surfaces 2a of the mold portions 2 with respect to the mold portions 2, via the connecting portions 4 that connect the plurality of mold portions 2 and the bladder 3 to each other. As a result, since the contact surfaces 2a of the plurality of mold portions 2 are separated from the inner peripheral surface 34 and the outer shape is smaller than the hollow portion 33, the jig 1 can be easily removed from the hollow portion 33.

Since the one end of the connection portion 5 connecting the mold portions 2 to each other is connected to the end portion 2b of the mold portion 2 on the one side so as to be movable rotationally, the connection portion 5 moves rotationally about the one end of the connection portion 5 when the positions of the mold portion 2 on the one side and the mold portion 2 on the other side, which are adjacent to each other, change. In addition, since the other end of the connection portion 5 is connected to the mold portion 2 on the other side so as to be movable along the width direction of the mold portion 2, the other end of the connection portion 5 moves along the width direction of the mold portion 2 on the other side when the positions of the mold portion 2 on the one side and the mold portion 2 on the other side, which are adjacent to each other, change. When the bladder 3 is inflated, the other end of the connection portion 5 moves to the end portion 2c side of the mold portion 2 on the other side. When the bladder 3 is deflated, the other end of the connection portion 5 moves toward a middle portion side of the mold portion 2 on the other side.

The connecting portion 4 connecting the mold portion 2 and the bladder 3 to each other is connected to the end portion 2c opposite to the end portion 2b of the mold portion 2 on the one side, to which the one end of the connection portion 5 is connected. Accordingly, since the connecting portion 4 is connected at the position different from the centroid of the mold portion 2, the mold portion 2 is pulled inward while rotating when the bladder 3 is deflated.

Next, a method of using the jig 1 according to the present embodiment when molding the stringer and the skin will be described.

First, the stringer 31 is provided inside the groove 45 formed in the surface of the mandrel 41 having an arcuate cross section.

Then, the jig 1 according to the present embodiment is provided inside the stringer 31, that is, a portion which is the hollow portion 33 between the skin 32 and the stringer 31. At this time, it is desirable that the bladder 3 is inflated to a degree that the jig 1 is insertable and the contact surfaces 2a of the plurality of mold portions 2 are possible to be aligned with the inner peripheral surface 34 formed between the skin 32 and the stringer 31.

After the jig 1 is provided, the skin 32 is laminated on the stringer 31 or the jig 1. At this time, the skin 32 is laminated while pressing the skin 32 and the stringer 31, for example, using the roller 42. Therefore, before pressing by the roller 42, the internal pressure of the bladder 3 is increased to withstand a pressing force by the roller 42. In addition, since the mold portions 2 having high rigidity are unlikely to deform in a lay-up step using the roller 42, the shape of the inner peripheral surface 34 can be defined.

Next, after work of laminating the skin 32 on the stringer 31 is completed and the stringer 31 and the skin 32 are integrated with each other, the internal pressure of the bladder 3 is decreased, and the bladder 3 is deflated. Then, after the contact surface 2a of the jig 1 is separated from the inner peripheral surface 34, the jig 1 can be removed from the hollow portion 33.

Although a case where the plurality of mold portions 2 are connected to each other by the connection portion 5 and have an annular cross section has been described in the embodiment described above, the present invention is not limited to this example.

Figure 6:
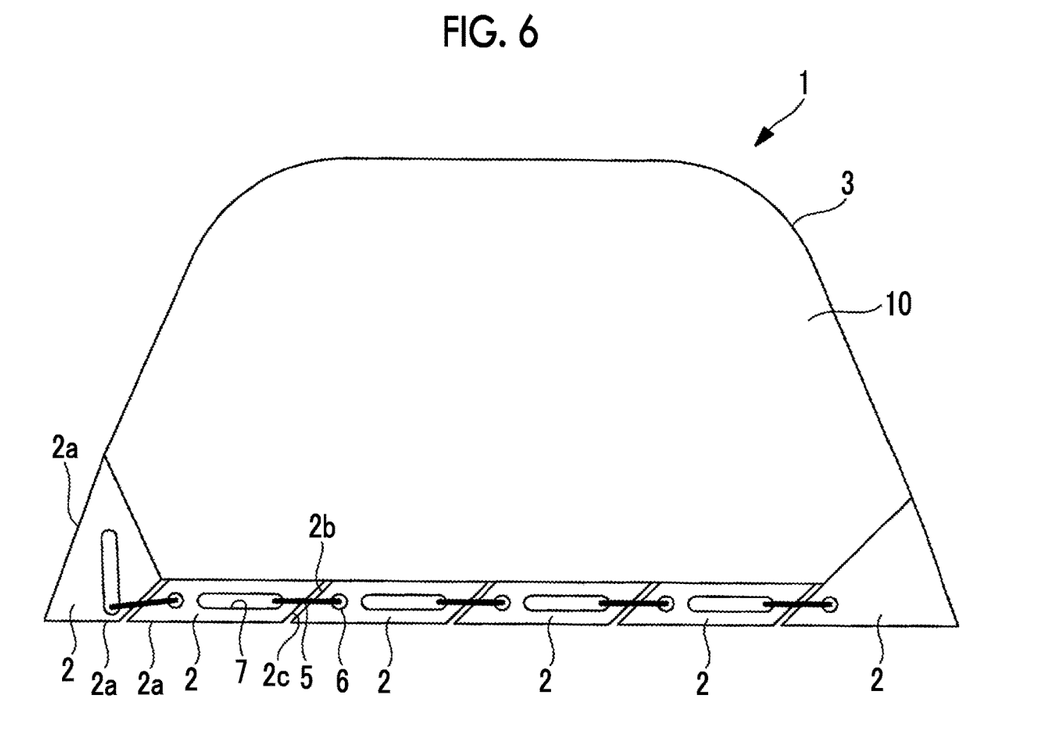
FIG. 6 is a cross sectional view showing a first modification example of the jig according to the embodiment of the present disclosure, and shows a state where the bladder is inflated.
Figure 7:
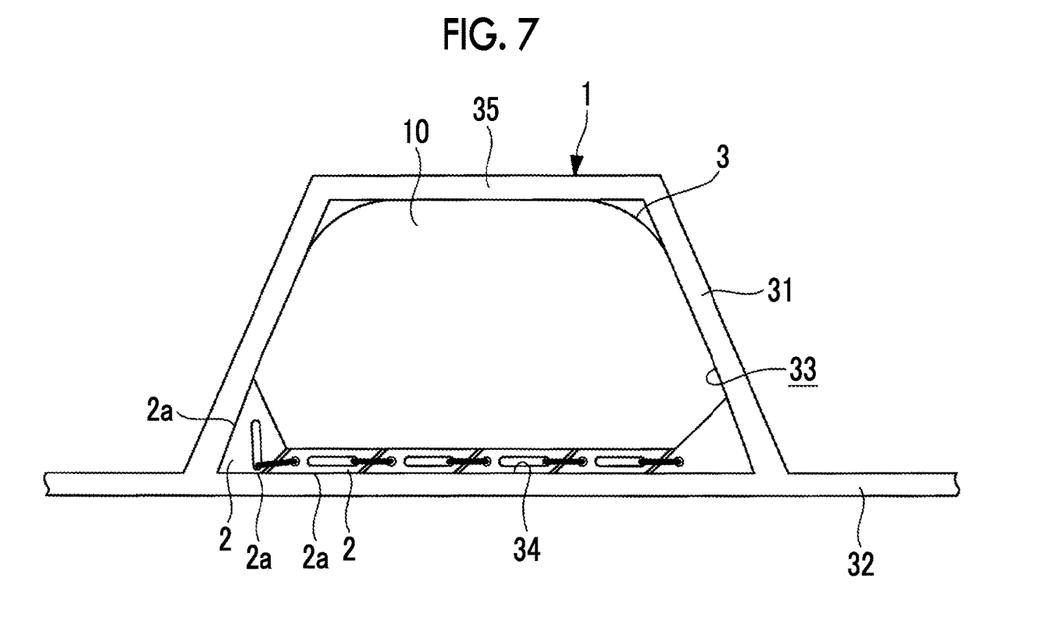
FIG. 7 is a cross sectional view showing a state where the first modification example of the jig according to the embodiment of the present disclosure is provided inside the hollow portion.
Figure 8:
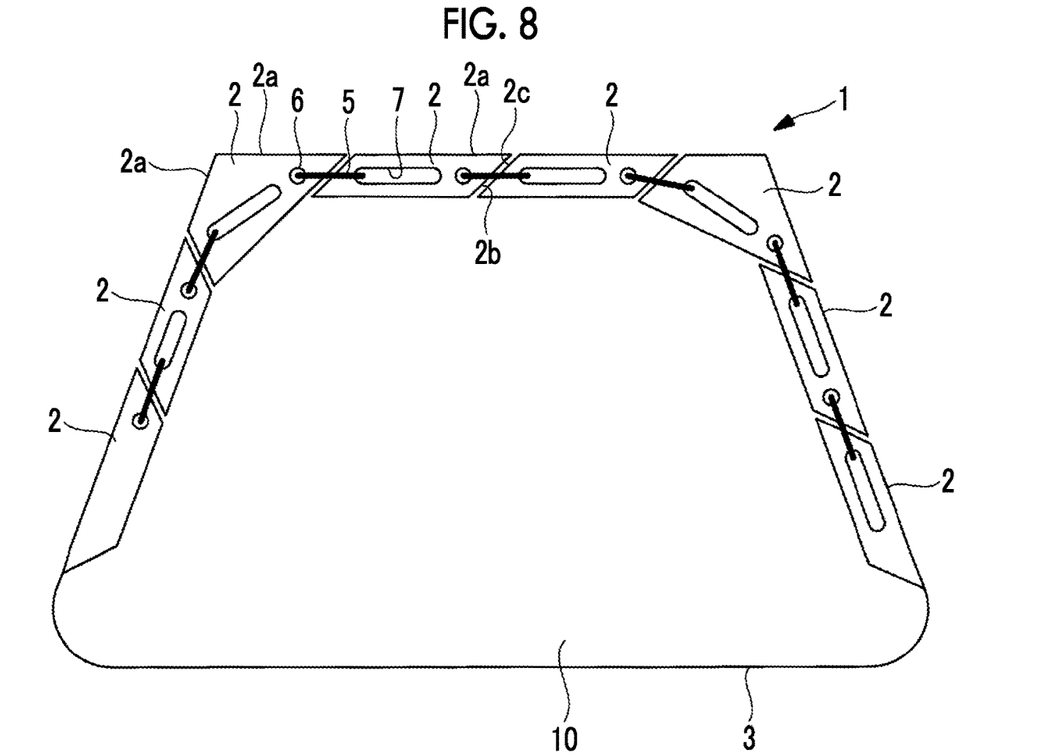
FIG. 8 is a cross sectional view showing a second modification example of the jig according to the embodiment of the present disclosure, and shows a state where the bladder is inflated.
Figure 9:
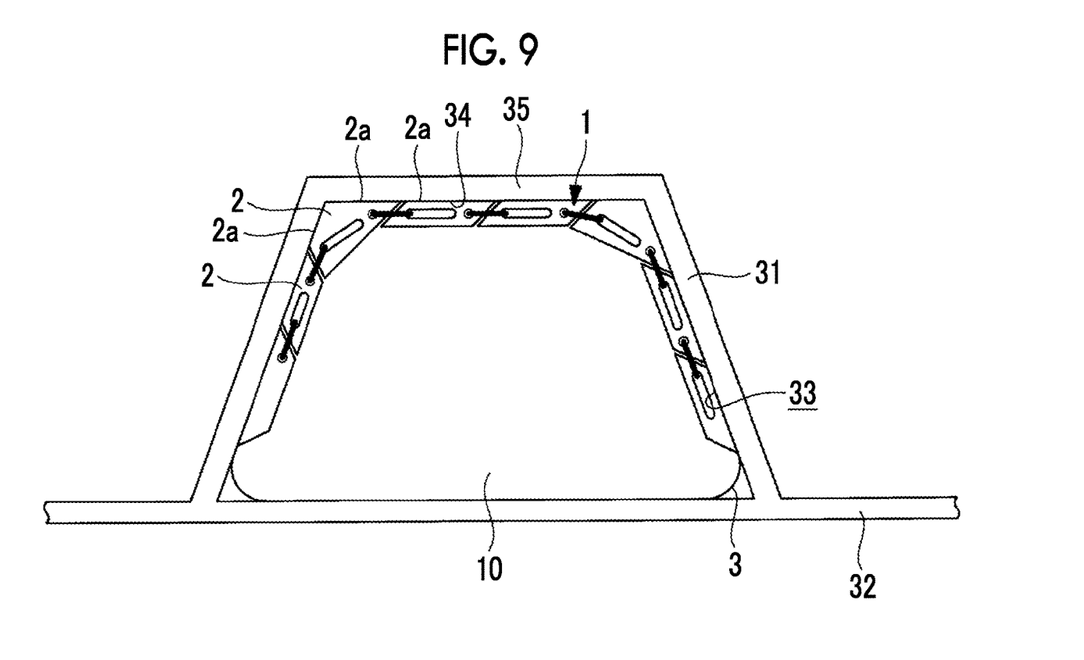
FIG. 9 is a cross sectional view showing a state where the second modification example of the jig according to the embodiment of the present disclosure is provided inside the hollow portion.

For example, as shown in FIGS. 6 and 8, the plurality of mold portions 2 may be connected to each other via the connection portion 5 such that the mold portions 2 arranged on both sides are free ends. That is, one side of each of the mold portions 2 arranged on both sides is not connected to another mold portion 2, and becomes a free end. In this case, as shown in FIGS. 7 and 9, when the bladder 3 is inflated, the contact surfaces 2a of the plurality of mold portions 2 come into contact with a part of the inner peripheral surface 34.

For example, when the jig 1 shown in FIG. 6 is disposed in the hollow portion 33 as shown in FIG. 7, the plurality of mold portions 2 may be provided on only one side with respect to the bladder 3 such that the mold portions 2 are in contact with only the skin 32 side. In this case, a shape on the skin 32 side can be defined by the inner peripheral surface 34. In addition, when the jig 1 shown in FIG. 7 is disposed in the hollow portion 33 as shown in FIG. 9, the plurality of mold portions 2 may be provided on only one side with respect to the bladder 3 such that the mold portions 2 are in contact with only the stringer 31 side. In this case, a shape on the stringer 31 side can be defined by the inner peripheral surface 34.

The jig 1 according to the present disclosure is applicable to any one of a case of forming a carbon fiber reinforced plastic (CFRP) molded product using a thermosetting resin and a case of forming a CFRP molded product using a thermoplastic resin. In particular, since CFRP using the thermoplastic resin is molded, even in a case where a material is pressed by the roller 42 at an extremely high pressure when laminating, compared to a case of using the thermosetting resin, the shape of the inner peripheral surface 34 between the skin 32 and the stringer 31 can be defined by preventing inflation from becoming equal to or larger than a specified shape. In addition, by deflating the bladder 3, the jig 1 can be easily removed from the hollow portion 33.

The jig described in the embodiment described hereinbefore is understood, for example, as follows.

A jig (1) according to the present disclosure is a jig inserted into a hollow portion (33) that is surrounded by an inner peripheral surface (34) of a tubular portion (35) of a material to be molded and is formed in one direction, and includes a plurality of mold portions (2) that each have a contact surface (2a) having a shape corresponding to the inner peripheral surface and are arranged in parallel in a direction intersecting the one direction, a bladder (3) that is provided on an opposite side to the contact surfaces of the plurality of mold portions with respect to the mold portions, can accommodate a fluid (10) therein, and is capable of expanding and contracting according to the pressure of the accommodated fluid, a connecting portion (4) that connects each of the plurality of mold portions and the bladder to each other, and a connection portion (5) that connects, among the plurality of mold portions, a mold portion on one side and a mold portion on the other side adjacent to the mold portion on the one side to each other and regulates an interval between the mold portion on the one side and the mold portion on the other side in the direction intersecting the one direction within a predetermined range.

In this configuration, since the plurality of mold portions have the contact surfaces each having a shape corresponding to the inner peripheral surface, the shape of the inner peripheral surface can be defined by the contact surfaces of the plurality of mold portions when forming a molded product. When a fluid is accommodated inside the bladder, the bladder is expanded and inflated according to the pressure of the fluid. The inflated bladder presses the plurality of mold portions from the opposite side to the contact surfaces of the mold portions with respect to the mold portions. Since the connection portion regulates the interval between the mold portion on the one side and the mold portion on the other side, among the plurality of mold portions, within a predetermined range, the interval between the plurality of mold portions is not excessively wide due to a pressing force of the bladder. As a result, since an inflated amount of the bladder can be suppressed within a predetermined range, the bladder can be prevented from being excessively inflated.

On the other hand, when the fluid is discharged from the inside of the bladder, the bladder is contracted and deflated according to the pressure of the fluid. The deflated bladder pulls the plurality of mold portions to a bladder side, which is on the opposite side to the contact surfaces of the mold portions with respect to the mold portions, via the connecting portion that connects each of the plurality of mold portions and the bladder to each other. As a result, since the contact surfaces of the plurality of mold portions are separated from the inner peripheral surface and the outer shape is smaller than the hollow portion, the jig can be easily removed from the hollow portion.

In the jig according to the present disclosure, the plurality of mold portions may be connected to each other via the connection portion such that a cross section taken in the direction intersecting the one direction is annular.

In this configuration, when the bladder is inflated, the contact surfaces of the plurality of mold portions come into contact with the entire inner peripheral surface.

In the jig according to the present disclosure, the plurality of mold portions may be connected to each other via the connection portion such that the mold portions arranged on both sides are free ends.

In this configuration, the mold portions arranged on both sides, among the plurality of mold portions arranged in parallel, each have one side that is not connected to another mold portion, and are connected to each other via the connection portion such that the mold portions are free ends. In this case, when the bladder is inflated, the contact surfaces of the plurality of mold portions come into contact with a part of the inner peripheral surface.

In the jig according to the present disclosure, the connection portion may be a bar-shaped member, and have one end connected to a fixing portion (6) provided at an end surface of the mold portion on the one side so as to be movable rotationally and the other end connected to a slide groove (7) provided at an end surface of the mold portion on the other side so as to be movable in a direction along the contact surface.

In this configuration, since the one end of the connection portion is connected to the fixing portion provided at the end surface of the mold portion on the one side so as to be movable rotationally, the connection portion moves rotationally about the one end of the connection portion when the positions of the mold portion on the one side and the mold portion on the other side, which are adjacent to each other, change. In addition, since the other end of the connection portion is connected to the slide groove provided in the end surface of the mold portion on the other side so as to be movable along the width direction, the other end of the connection portion moves along the width direction of the mold portion on the other side when the positions of the mold portion on the one side and the mold portion on the other side, which are adjacent to each other, change. When the bladder is inflated, the other end of the connection portion moves to the end portion side of the mold portion on the other side. When the bladder is deflated, the other end of the connection portion moves toward the middle portion side of the mold portion on the other side.

In the jig according to the present disclosure, the length of the connection portion may be equal to a distance between the fixing portion of the mold portion on the one side and the end portion of the slide groove of the mold portion on the other side, which is on the end portion side in the width direction, which is opposite to the end portion where the fixing portion is provided, when the bladder is inflated.

In this configuration, when the bladder is inflated, the interval between the mold portion on the one side and the mold portion on the other side is regulated within a predetermined range.

In the jig according to the present disclosure, the connecting portion may be connected to the other end portion opposite to the one end portion of the mold portion on the one side to which the one end of the connection portion is connected.

In this configuration, since the connecting portion is connected at the position different from the centroid of the mold portion on the one side, the mold portion on the one side is pulled inward while rotating when the bladder is deflated.

The jig according to the present disclosure may be disposed by being divided into a plurality of portions in a longitudinal direction of the hollow portion of the material to be molded.

In this configuration, also in a case where the material to be molded is curved in the longitudinal direction, the jig can be disposed in the hollow portion.

REFERENCE SIGNS LIST

1: jig
2: mold portion
2A: corner component
2B: flat component
2a: contact surface
2b, 2c: end portion
3: bladder
4: connecting portion
5: connection portion
6: fixing portion
7: slide groove
10: fluid
31: stringer
32: skin
33: hollow portion
34: inner peripheral surface
35: tubular portion
41: mandrel
42: roller
43: bladder
45: groove

The invention claimed is:

1. A jig that is inserted into a hollow portion, which is surrounded by an inner peripheral surface of a tubular portion of a material to be molded and is formed in one direction, the jig comprising:
a plurality of mold portions that each have a contact surface having a shape corresponding to the inner peripheral surface and are arranged in parallel in a direction intersecting the one direction;
a bladder that is provided on an opposite side to the contact surfaces of the mold portions with respect to the mold portions, is capable of accommodating a fluid therein, and is capable of expanding and contracting according to a pressure of the accommodated fluid;
a connecting portion that connects the plurality of mold portions and the bladder to each other; and
a connection portion that connects, among the plurality of mold portions, a mold portion on one side and a mold portion on the other side adjacent to the mold portion on the one side to each other and regulates an interval between the mold portion on the one side and the mold portion on the other side in the direction intersecting the one direction within a predetermined range.

2. The jig according to claim 1,
wherein the plurality of mold portions are connected to each other via the connection portion such that a cross section taken in the direction intersecting the one direction is annular.

3. The jig according to claim 1,
wherein the plurality of mold portions are connected to each other via the connection portion such that the mold portions arranged on both sides are free ends.

4. The jig according to claim 1,
wherein the connection portion is a bar-shaped member and has one end connected to a fixing portion provided at an end surface of the mold portion on the one side so as to be movable rotationally and the other end connected to a slide groove provided in an end surface of the mold portion on the other side so as to be movable in a direction along the contact surface.

5. The jig according to claim 4,
wherein a length of the connection portion is equal to a distance between the fixing portion of the mold portion on the one side and an end portion of the slide groove of the mold portion on the other side, which is on an end portion side in a width direction, which is opposite to an end portion where the fixing portion is provided, when the bladder is inflated.

6. The jig according to claim 1,
wherein the connecting portion is connected to the other end portion opposite to one end portion of the mold portion on the one side to which one end of the connection portion is connected.

7. The jig according to claim 1,
wherein the jig is disposed by being divided into a plurality of portions in a longitudinal direction of the hollow portion of the material to be molded.

* * * * *